US012592462B2

(12) United States Patent
Lee

(10) Patent No.: US 12,592,462 B2
(45) Date of Patent: Mar. 31, 2026

(54) POUCH-SHAPED BATTERY CELL CONFIGURED SUCH THAT REPLENISHMENT OF ELECTROLYTIC SOLUTION IS POSSIBLE

(71) Applicant: LG Energy Solution, Ltd., Seoul (KR)

(72) Inventor: Han Young Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 728 days.

(21) Appl. No.: 17/793,825

(22) PCT Filed: Jun. 24, 2021

(86) PCT No.: PCT/KR2021/007926
§ 371 (c)(1),
(2) Date: Jul. 19, 2022

(87) PCT Pub. No.: WO2021/261932
PCT Pub. Date: Dec. 30, 2021

(65) Prior Publication Data
US 2023/0307807 A1 Sep. 28, 2023

(30) Foreign Application Priority Data
Jun. 25, 2020 (KR) ......................... 10-2020-0077564

(51) Int. Cl.
*H01M 50/682* (2021.01)
*H01M 10/42* (2006.01)
(Continued)

(52) U.S. Cl.
CPC ....... *H01M 50/682* (2021.01); *H01M 10/425* (2013.01); *H01M 50/105* (2021.01); *H01M 50/211* (2021.01)

(58) Field of Classification Search
None
See application file for complete search history.

(56) References Cited

U.S. PATENT DOCUMENTS 3,445,295 A    5/1969  Smith et al.
2009/0197160 A1  8/2009  Fujiwara et al.
(Continued)

FOREIGN PATENT DOCUMENTS

JP        S4928046 B1    7/1974
JP        2011108368 A    6/2011
(Continued)

OTHER PUBLICATIONS

KR2013038655A Machine translation (Year: 2013).*
(Continued)

*Primary Examiner* — Jonathan G Leong
*Assistant Examiner* — Aryana Y. Ortiz
(74) *Attorney, Agent, or Firm* — Lerner David LLP

(57) ABSTRACT

The present invention relates to a pouch-shaped battery cell configured such that an electrolytic solution depleted during charging and discharging of the pouch-shaped battery cell is replenished, whereby lifespan characteristics of the pouch-shaped battery cell are improved, wherein the pouch-shaped battery cell includes a battery case made of a laminate sheet, an electrode assembly received in the battery case, an inner pouch located on the outer surface of the electrode assembly, the inner pouch having an electrolytic solution for replenishment received therein, and a penetration member configured to penetrate the inner pouch in order to discharge the electrolytic solution for replenishment, wherein the penetration member is deformed to discharge the electrolytic solution for replenishment received in the inner pouch when pressure in the battery case increases.

12 Claims, 4 Drawing Sheets

(51) Int. Cl.
    *H01M 50/105*     (2021.01)
    *H01M 50/211*     (2021.01)

(56)         References Cited

U.S. PATENT DOCUMENTS

| | | |
|---|---|---|
| 2018/0123121 A1 | 5/2018 | Buchkremer et al. |
| 2018/0159112 A1 | 6/2018 | Chung et al. |
| 2018/0296186 A1 | 10/2018 | Harks et al. |
| 2019/0006635 A1 | 1/2019 | Kim et al. |
| 2020/0287226 A1 | 9/2020 | Kim et al. |
| 2021/0074989 A1 | 3/2021 | Han et al. |

FOREIGN PATENT DOCUMENTS

| | | | | |
|---|---|---|---|---|
| JP | 2011165614 A | | 8/2011 | |
| JP | 2011238456 A | | 11/2011 | |
| JP | 2012243672 A | | 12/2012 | |
| JP | 2013134878 A | | 7/2013 | |
| JP | 5603649 B2 | | 10/2014 | |
| KR | 20100051403 A | | 5/2010 | |
| KR | 20110106527 A | | 9/2011 | |
| KR | 2013038655 A | * | 4/2013 | |
| KR | 20130106796 A | | 9/2013 | |
| KR | 20160032482 A | | 3/2016 | |
| KR | 20160133135 A | | 11/2016 | |
| KR | 101803825 B1 | | 12/2017 | |
| KR | 20170140919 A | | 12/2017 | |
| KR | 20180062826 A | | 6/2018 | |
| KR | 101936074 B1 | | 1/2019 | |
| KR | 20190109959 A | | 9/2019 | |
| KR | 20200020310 A | | 2/2020 | |
| KR | 20200050782 A | | 5/2020 | |
| RU | 2013112715 A | | 9/2014 | |
| WO | 2010053256 A2 | | 5/2010 | |
| WO | WO-2017217646 A1 | * | 12/2017 | .......... H01M 10/056 |

OTHER PUBLICATIONS

International Search Report for Application No. PCT/KR2021/007926 mailed Oct. 12, 2021, 2 pages.
Extended European Search Report including Written Opinion for Application No. 21828865.2 dated Jun. 23, 2023, pp. 1-8.
Search Report dated Apr. 17, 2025 from the Office Action for Chinese Application No. 202180006520.1 Issued Apr. 21, 2025, pp. 1-2.

* cited by examiner

【FIG. 1】
<u>100</u>
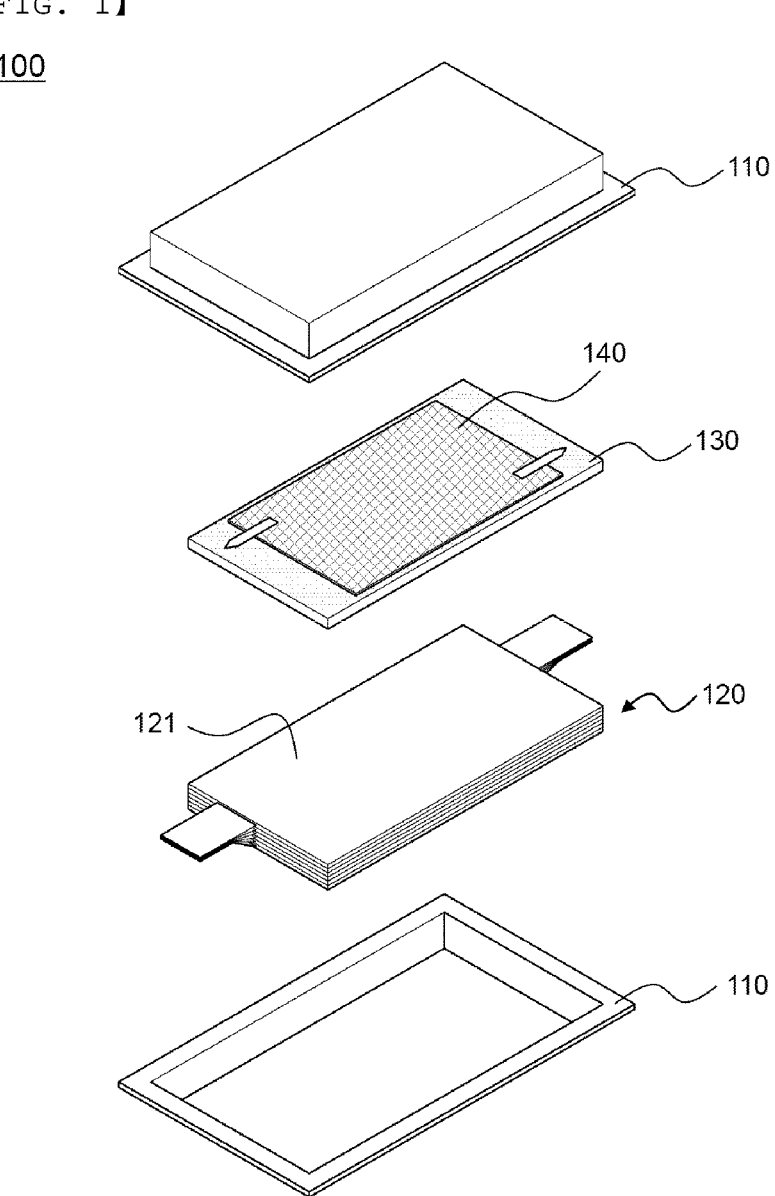

【FIG. 2】
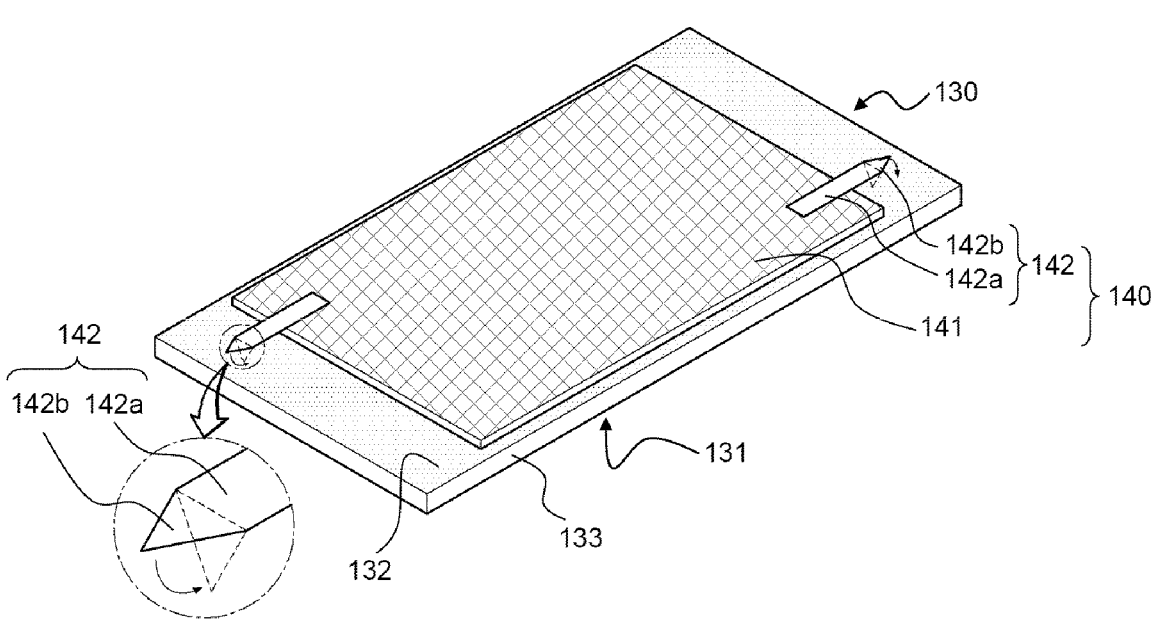

【FIG. 3】
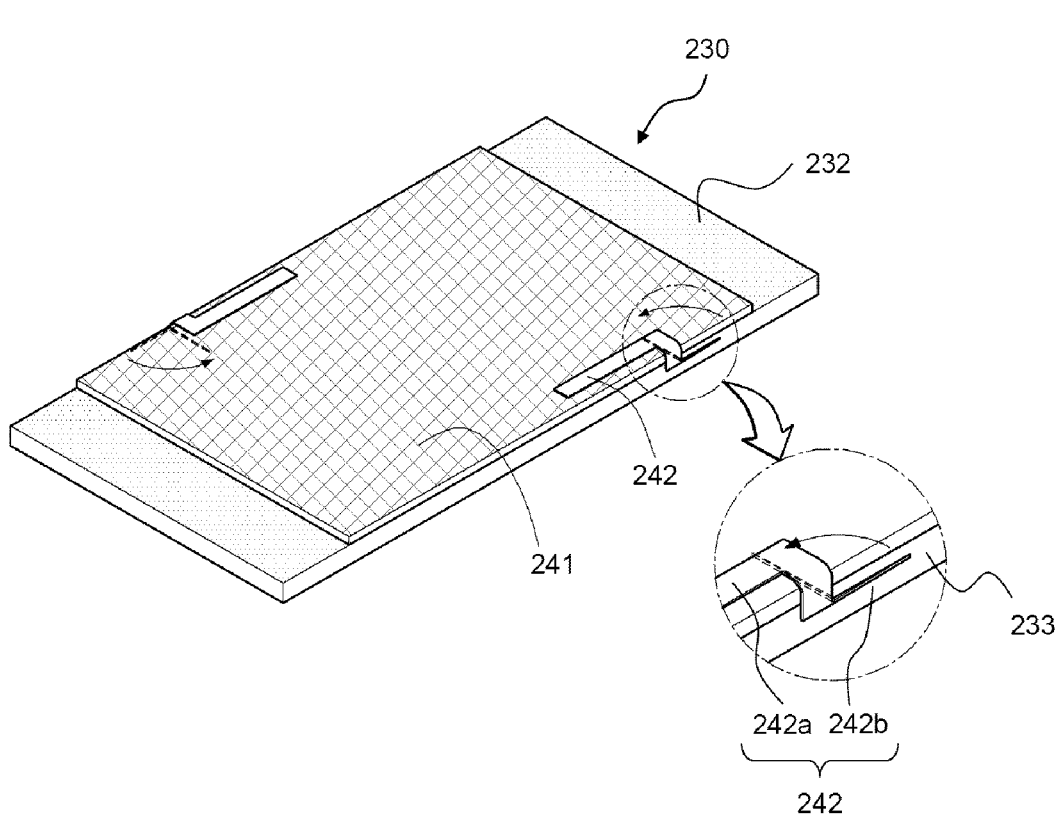

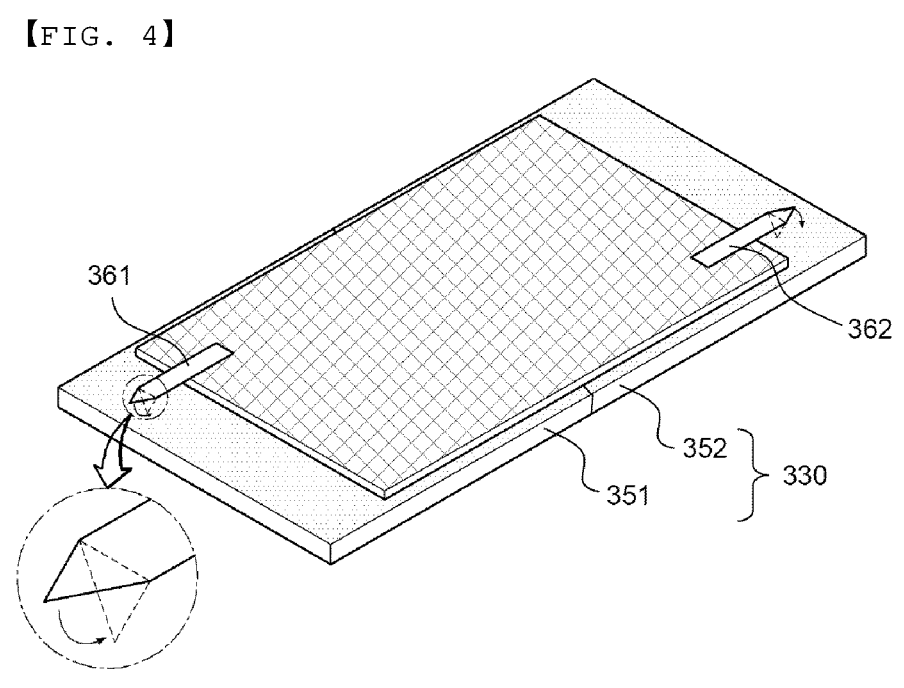

【FIG. 4】

POUCH-SHAPED BATTERY CELL CONFIGURED SUCH THAT REPLENISHMENT OF ELECTROLYTIC SOLUTION IS POSSIBLE

CROSS-REFERENCE TO RELATED APPLICATIONS

This application is a national stage entry under 35 U.S.C. § 371 of International Application No. PCT/KR2021/007926, filed on Jun. 24, 2021, which claims priority to Korean Patent Application No. 10-2020-0077564, filed on Jun. 25, 2020, the disclosures of which are hereby incorporated herein by reference in their entireties.

TECHNICAL FIELD

This application claims the benefit of priority to Korean Patent Application No. 2020-0077564 filed on Jun. 25, 2020, the disclosure of which is incorporated herein by reference in its entirety.

The present invention relates to a pouch-shaped battery cell configured such that replenishment of an electrolytic solution is possible, and more particularly to a pouch-shaped battery cell configured such that replenishment of an electrolytic solution is possible, wherein an inner pouch having an electrolytic solution for replenishment received therein is provided in a battery case, and the electrolytic solution is supplied to an electrode assembly when replenishment of the electrolytic solution is necessary.

BACKGROUND ART

A lithium secondary battery, which is capable of being charged and discharged, is appropriately used as a built-in battery cell, since it is unnecessary to replace a battery cell, and has been applied to various kinds of devices with rapid improvement in stability and rapid increase in capacity thereof.

For example, the lithium secondary battery has been widely used as an energy source for wireless mobile devices, which are small multifunctional products, or wearable devices, which are worn on bodies, and has also been used as an energy source for electric vehicles and hybrid electric vehicles presented as alternatives to existing gasoline and diesel vehicles, which cause air pollution.

The lithium secondary battery is configured to have a structure in which an electrode assembly, which includes a lithium-based positive electrode, a negative electrode at which occlusion and discharging of lithium ions reversibly occur, and a separator configured to secure insulation of the positive electrode and the negative electrode, and an electrolytic solution configured to provide a transmission path of the lithium ions are received in a battery case.

During repeated charging and discharging of the lithium secondary battery, side reaction occurs between the surface of the electrode and the electrolytic solution, whereby the crystal structure of each of the positive electrode and the negative electrode collapses, and the electrolytic solution is depleted. As a result, lifespan of the lithium secondary battery is reduced.

In particular, mobility of the lithium ions is reduced due to depletion of the electrolytic solution, whereby resistance of the battery cell is increased, and therefore performance of the lithium secondary battery is abruptly deteriorated.

In order to solve this problem, a method of additionally injecting the electrolytic solution during use of the lithium secondary battery may be considered. In the case in which the battery cell is disassembled in order to add the electrolytic solution, however, there is a high possibility of the electrode being exposed to air, and there is a problem in that it is difficult to seal the disassembled battery cell again.

As another method, Patent Document 1 discloses an electric device including a surplus electrolytic solution support portion provided at the periphery of a power generation element formed by stacking an electrode layer and an electrolyte layer in order to solve excess and deficiency of an electrolytic solution in an electrode surface due to expansion and contraction of an electrode layer during charging and discharging and a module for electric devices having a pressure transmission medium provided in a space between the surface of the electric device and a case.

In Patent Document 1, when the electrode layer expands, pressure is transmitted to the pressure transmission medium, and, when the pressure transmitted to the pressure transmission medium is transmitted to the surplus electrolytic solution support portion, an electrolytic solution received in the surplus electrolytic solution support portion is discharged.

In Patent Document 1, as described above, the pressure transmission medium, as a means configured to discharge the electrolytic solution, is disposed between electrode layers, whereby the capacity of a battery is reduced.

As another example, Patent Document 2 relates to a pouch-shaped secondary battery having an air cap, as an electrolytic solution replenishment member, provided at an inner wall of the pouch-shaped secondary battery, wherein, when the air cap formed inside a battery case is broken, an electrolytic solution received in the air cap is discharged.

In Patent Document 2, a process of providing the air cap having the electrolytic solution received therein at the inside of the battery case is separately required, whereby a manufacturing process is complicated. In addition, the air cap is configured to be easily broken, whereby the air cap is broken by external impact even before the electrolytic solution may be depleted, and therefore the electrolytic solution received in the air cap may be discharged. Consequently, it is difficult to adjust the point in time at which the electrolytic solution is to be replenished.

Therefore, there is a high necessity for technology capable of preventing reduction in capacity of a battery cell while increasing lifespan of the battery cell by the provision of a structure capable of replenishing an electrolytic solution that is depleted during use of a lithium secondary battery and capable of simplifying a manufacturing process.

PRIOR ART DOCUMENTS (Patent Document 1) Japanese Patent Application Publication No. 2013-134878 (2013 Jul. 8)
(Patent Document 2) Korean Patent Application Publication No. 2013-0106796 (2013 Sep. 30)

DISCLOSURE

Technical Problem

The present invention has been made in view of the above problems, and it is an object of the present invention to provide a pouch-shaped battery cell configured such that replenishment of an electrolytic solution is possible to prevent reduction in lifespan of the pouch-shaped battery cell due to depletion of the electrolytic solution during repeated charging and discharging of the pouch-shaped battery cell.

Technical Solution

A pouch-shaped battery cell according to the present invention to accomplish the above object includes a battery case made of a laminate sheet, an electrode assembly received in the battery case, an inner pouch located on the outer surface of the electrode assembly, the inner pouch having an electrolytic solution for replenishment received therein, and a penetration member configured to penetrate the inner pouch in order to discharge the electrolytic solution for replenishment, wherein the penetration member is deformed to discharge the electrolytic solution for replenishment received in the inner pouch when pressure in the battery case increases.

In the pouch-shaped battery cell according to the present invention, the electrolytic solution for replenishment may include no film formation additive.

In the pouch-shaped battery cell according to the present invention, the inner pouch may be located on at least one of the upper surface and the lower surface of the electrode assembly, which are outer surfaces parallel to an electrode plate of the electrode assembly.

In the pouch-shaped battery cell according to the present invention, the inner pouch may include a first surface that faces the electrode assembly, a second surface that faces the penetration member, the second surface being an outer surface opposite the first surface, and a side surface excluding the first surface and the second surface.

In the pouch-shaped battery cell according to the present invention, the penetration member may include a piezoelectric element configured to generate voltage depending on the pressure in the battery case and an electroactive polymer (EAP) pin configured to be deformed by the voltage generated by the piezoelectric element.

In addition, the EAP pin may be flat in a normal state, and may be bent and deformed in a direction toward the inner pouch when the pressure in the battery case increases.

In the pouch-shaped battery cell according to the present invention, the piezoelectric element may be flat plate shape, and the EAP pin may include a coupling portion coupled to the piezoelectric element and a deformation portion configured to be deformed when the voltage increases.

In the pouch-shaped battery cell according to the present invention, the deformation portion may be bent perpendicular to the coupling portion and may penetrate the inner pouch.

Alternatively, in the pouch-shaped battery cell according to the present invention, the deformation portion may be bent perpendicular to the side surface of the inner pouch and may penetrate the inner pouch.

In the pouch-shaped battery cell according to the present invention, the penetration member may include a first EAP pin and a second EAP pin connected to a single piezoelectric element.

In the pouch-shaped battery cell according to the present invention, the inner pouch may include a first receiving portion and a second receiving portion partitioned from each other, and deformation voltage of the first EAP pin configured to penetrate the first receiving portion and deformation voltage of the second EAP pin configured to penetrate the second receiving portion may be different from each other.

In addition, the present invention provides a battery pack including a battery cell stack configured to receive the pouch-shaped battery cell in plural, wherein the pouch-shaped battery cell is arranged in tight contact with another pouch-shaped battery cell adjacent thereto in the battery cell stack.

Advantageous Effects

As is apparent from the above description, a pouch-shaped battery cell according to the present invention is configured to have a structure in which, only when pressure in a battery case increases, replenishment of an electrolytic solution is possible, and therefore, when an electrolytic solution initially injected into the pouch-shaped battery cell is depleted and replenishment of the electrolytic solution is necessary, an electrolytic solution for replenishment may move to an electrode assembly.

In addition, only a piezoelectric element having an electroactive polymer attached thereto is added together with an inner pouch having an electrolytic solution for replenishment received therein, whereby it is possible to minimize an increase in overall thickness of the pouch-shaped battery cell.

In addition, since pouch-shaped battery cells are disposed in tight contact with each other to constitute a battery module or a battery pack, the piezoelectric element may generate voltage even due to an increase in pressure in the pouch-shaped battery cell, and therefore the electroactive polymer may be deformed and may penetrate the inner pouch.

Since, the electrolytic solution for replenishment is added, as described above, it is possible to prevent an increase in resistance of the pouch-shaped battery cell due to depletion of the electrolytic solution, whereby it is possible to provide a pouch-shaped battery cell having improved cycle characteristics.

DESCRIPTION OF DRAWINGS

FIG. 1 is an exploded perspective view of a pouch-shaped battery cell according to the present invention.

FIG. 2 is a perspective view of an inner pouch and a penetration member according to a first embodiment.

FIG. 3 is a perspective view of an inner pouch and a penetration member according to a second embodiment.

FIG. 4 is a perspective view of an inner pouch and a penetration member according to a third embodiment.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present invention will be described in detail with reference to the accompanying drawings.

FIG. 1 is an exploded perspective view of a pouch-shaped battery cell according to the present invention.

Referring to FIG. 1, the pouch-shaped battery cell 100 is configured such that an electrode assembly 120, an inner pouch 130, and a penetration member 140 are received in a battery case 110 made of a laminate sheet.

The battery case 110 shown in FIG. 1 is configured to have a structure in which an upper case and a lower case are separated from each other. Alternatively, an integrated battery case configured to have a structure in which the outer perimeter of one side of an upper case and the outer perimeter of one side of a lower case are connected to each other may be used.

The laminate sheet may be configured to have a structure in which an outer resin layer, an air and moisture blocking metal layer, and a thermally fusible inner resin layer are stacked.

It is required for the outer resin layer to exhibit tolerance to an external environment, and therefore more than predetermined tensile strength and weather resistance are necessary. In this aspect, a polymer resin constituting the outer resin layer may include polyethylene naphthalate (PEN), polyethylene terephthalate (PET), or oriented nylon, which exhibits excellent tensile strength and weather resistance.

The metal layer may be made of aluminum (Al) or an aluminum alloy in order to exhibit a function of improving strength of the battery case in addition to a function of preventing introduction of foreign matter, such as gas and moisture, or leakage of an electrolytic solution. Examples of the aluminum alloy may include alloy numbers 8079, 1N30, 8021, 3003, 3004, 3005, 3104, and 3105. These materials may be used alone or in the form of a combination of two or more thereof.

A polymer resin that exhibits thermal fusibility (thermal adhesiveness), has low hygroscopicity to the electrolytic solution in order to inhibit permeation of the electrolytic solution, and is not expanded or eroded by the electrolytic solution may be used as the inner resin layer. More preferably, the inner resin layer is made of cast polypropylene (CPP).

The electrode assembly 120 shown in FIG. 1 is a stacked electrode assembly configured to have a structure in which a positive electrode plate and a negative electrode plate are stacked in the state in which a separator is interposed therebetween. However, the structure of the electrode assembly according to the present invention is not limited thereto. The electrode assembly may be a stacked and folded type electrode assembly, configured to have a structure in which a plurality of bicells and/or monocells is wound in a state of being disposed on a separation film, a laminated and stacked type electrode assembly, configured to have a structure in which a plurality of bicells and/or monocells is stacked in the state in which a separator is interposed therebetween, or a jelly-roll type electrode assembly, configured to have a structure in which a positive electrode sheet and a negative electrode sheet are wound in the state in which a separator sheet is interposed therebetween.

A bicell is a battery cell configured to have a structure in which two positive electrodes and one negative electrode are stacked in the state in which separators are interposed therebetween or a battery cell configured to have a structure in which two negative electrodes and one positive electrode are stacked in the state in which separators are interposed therebetween. A monocell is a battery cell configured to have a structure in which one positive electrode and one negative electrode are stacked in the state in which a separator is interposed therebetween.

In the pouch-shaped battery cell according to the present invention, the penetration member 140 is bent and deformed to discharge an electrolytic solution for replenishment received in the inner pouch 130 when pressure in the battery case increases. That is, it is preferable for the inner pouch 130 and the penetration member 140 to be arranged in tight contact with each other and for the inner pouch 130 and the electrode assembly 120 to be arranged in tight contact with each other such that the penetration member 140 penetrates the inner pouch 130 to move the electrolytic solution for replenishment in a direction toward the electrode assembly.

As shown in FIG. 1, therefore, the inner pouch 130 may be disposed on the upper surface 121 of the electrode assembly 120, which is an outer surface parallel to the electrode plates of the electrode assembly.

In addition, unlike what is shown in FIG. 1, the inner pouch may be disposed on each of the upper surface and the lower surface of the electrode assembly, and the penetration member may be disposed on the outer surface of the inner pouch, in consideration of the amount of the electrolytic solution for replenishment.

The material for the inner pouch is not particularly restricted as long as the inner pouch is made of a material that does not chemically react with the electrolytic solution and that is easily broken by the penetration member.

In the case in which an elastic material is used as the inner pouch, the electrolytic solution for replenishment received in the inner pouch may be easily discharged to the outside, since the inner pouch shrinks due to elastic force thereof. In addition, when the inner pouch shrinks after the electrolytic solution for replenishment is discharged, empty space in the battery case increases, whereby pressure in the battery cell may be reduced, and therefore safety of the battery cell may be improved.

For example, polypropylene (PP), polyethylene (PE), or polytetrafluoroethylene (PTFE) may be used as the material for the inner pouch.

FIG. 2 is a perspective view of an inner pouch and a penetration member according to a first embodiment, which are the inner pouch and the penetration member shown in FIG. 1.

Referring to FIG. 2 together with the FIG. 1, the inner pouch 130 has a structure including a first surface 131 that faces the electrode assembly 120, a second surface 132 that faces the penetration member 140, the second surface being the outer surface opposite the first surface 131, and a side surface 133 excluding the first surface 131 and the second surface 132, i.e. a rectangular parallelepiped structure.

Alternatively, unlike what is shown in FIG. 1, each of the first surface 131 and the second surface 132 may include a curved outer perimeter. However, it is preferable for each of the first surface 131 and the second surface 132 to have a size such that the outer perimeter of each of the first surface 131 and the second surface 132 does not protrude farther than a corresponding one of the upper surface 121 and the lower surface of the electrode assembly.

The penetration member 140 includes a piezoelectric element 141 and an electroactive polymer (EAP) pin 142.

At least one selected from the group consisting of crystal, tourmaline, and Rochelle salt may be used as an example of the piezoelectric element 141. When pressure is applied to the piezoelectric element, mechanical energy may be converted into electrical energy, whereby voltage may be generated.

The EAP pin is a pin made of an electroactive polymer (EAP), which has a property of shrinking when electricity flows therein. The EAP pin may be deformed by the voltage generated by the piezoelectric element.

In a concrete example, the battery case may expand due to a heat generation phenomenon and a gas generation phenomenon that occur while the pouch-shaped battery cell is used, whereby pressure in the battery case may be increased. When the piezoelectric element is pressed by the increased pressure in the battery case, the piezoelectric element may generate voltage. Since the piezoelectric element is electrically connected (not shown) to the EAP pin, the EAP pin may be deformed.

Specifically, referring to FIG. 2, the piezoelectric element 141 is flat plate shape and is disposed such that the entire portion of the piezoelectric element that faces the second surface 132 of the inner pouch 130 is in tight contact with the second surface 132. Consequently, not only the pressure of gas generated as a result of side reaction between the electrode and the electrolytic solution but also pressure applied by the swollen electrode assembly are transmitted to the piezoelectric element 141 via the inner pouch 130 and act as external force that pushes the piezoelectric element 141.

In a concrete example, it is possible to manufacture a battery pack including a battery cell stack configured to receive a plurality of pouch-shaped battery cells according to the present invention therein and to allow the plurality of pouch-shaped battery cells to be arranged in tight contact with pouch-shaped battery cells adjacent thereto.

Generally, in the case in which an initial electrolytic solution in a pouch-shaped battery cell is depleted and replenishment of the electrolytic solution is necessary, pressure in the pouch-shaped battery cell is several or more times initial pressure in the battery cell.

Since the pouch-shaped battery cells are arranged in tight contact with each other in the battery cell stack, swelling of the battery case is limited, whereby pressure in the battery case increased by gas generated therein acts as force that presses the piezoelectric element.

Consequently, pressure sufficient for the piezoelectric element to generate voltage may be applied to the piezoelectric element, and the EAP pin is deformed by the voltage generated by the piezoelectric element, whereby a through-hole is formed in the inner pouch.

The through-hole is formed as a result of the EAP pin being deformed and penetrating the inner pouch. The electrolytic solution received in the inner pouch moves to the electrode assembly through the through-hole, whereby replenishment of the electrolytic solution is achieved.

In a normal state, the EAP pin 142 is flat. When pressure in the battery case increases, the EAP pin may be bent and deformed in a direction toward the inner pouch 130. The EAP pin 142 includes a coupling portion 142a coupled to the piezoelectric element 141 and a deformation portion 142b configured to be deformed at the time of generation of voltage.

When the deformation portion 142b is bent perpendicular to the coupling portion 142a, the deformation portion 142b penetrates the second surface 132 of the inner pouch 130, whereby a through-hole is formed in the second surface 132. Consequently, the electrolytic solution for replenishment received in the inner pouch 130 may be discharged in the direction toward the electrode assembly through the through-hole.

In order to prevent damage to the electrode assembly due to deformation of the deformation portion 142b, however, it is preferable for the length of the deformation portion to be formed so as to be less than the thickness of the inner pouch.

FIG. 2 shows the structure in which two EAP pins are disposed at opposite side ends of the piezoelectric element 141. Alternatively, a single EAP pin may be coupled to the piezoelectric element, or three or more EAP pins may be coupled to the piezoelectric element in order to rapidly discharge the electrolytic solution for replenishment. However, it is preferable for a plurality of EAP pins to be disposed at different outer perimeters of the piezoelectric element so as to be spaced apart from each other in consideration of the purpose to rapidly supply the electrolytic solution for replenishment to the entire portion of the electrode assembly.

FIG. 3 is a perspective view of an inner pouch and a penetration member according to a second embodiment.

Referring to FIG. 3, a piezoelectric element 241 is flat plate shape and is disposed such that the entire portion of the piezoelectric element that faces a second surface 232 of the inner pouch 230 is in tight contact with the second surface 232.

An EAP pin 242 includes a coupling portion 242a coupled to the piezoelectric element 241 and a deformation portion 242b configured to be deformed at the time of generation of voltage.

For the EAP pin 242 of FIG. 3, in a normal state, the coupling portion 242a is located at the upper surface of the flat plate shaped piezoelectric element 241, and the deformation portion 242b is located on the side surface of the piezoelectric element 241 and the side surface 233 of the inner pouch 230. When pressure is applied to the piezoelectric element and voltage is generated, the deformation portion 242b is bent perpendicular to the side surface 233 of the inner pouch 230 and penetrates the side surface 233. Consequently, the deformation portion is deformed such that a through-hole is formed in the side surface 233. The state in which the deformation portion is deformed is indicated by a dotted line.

In the case in which the EAP pin 242 configured such that the deformation portion 242b is disposed so as to penetrate the side surface 233 of the inner pouch 230 is used, there is a merit in that the electrode assembly is not damaged by the bent and deformed EAP pin 242 even though the EAP pin 242 is sharp and long so as to fully penetrate the inner pouch.

That is, in the case in which the EAP pin 242 shown in FIG. 3 is used, the deformation portion may be longer than the deformation portion of the EAP pin 142 shown in FIG. 2, whereby a process of forming the through-hole in the inner pouch may be rapidly performed, and a process of injecting the electrolytic solution for replenishment may be performed with improved safety since the side surface of the inner pouch is penetrated.

FIG. 4 is a perspective view of an inner pouch and a penetration member according to a third embodiment.

Referring to FIG. 4, the inner pouch 330 includes a first receiving portion 351 and a second receiving portion 352 partitioned from each other. Consequently, even in the case in which a through-hole is formed in the first receiving portion 351 by a first EAP pin 361 and an electrolytic solution for replenishment is discharged from the first receiving portion 351, the second receiving portion 352 may be maintained in a state in which an electrolytic solution for replenishment is not discharged therefrom. On the other hand, even in the case in which a through-hole is formed in the second receiving portion 352 by a second EAP pin 362 and an electrolytic solution for replenishment is discharged from the second receiving portion 352, the first receiving portion 351 may be maintained in a state in which the electrolytic solution for replenishment is not discharged therefrom. That is, leakage of the electrolytic solution from any one of the first receiving portion 351 and the second receiving portion 352 does not affect the other receiving portion.

That is, the first EAP pin 361 and the second EAP pin 362 may be set so as to have different deformation voltages such that the electrolytic solution is sequentially discharged from the first receiving portion and the second receiving portion.

For example, the first EAP pin and the second EAP pin may be manufactured using materials having different deformation voltages. Alternatively, a piezoelectric element to which the first EAP pin is coupled and a piezoelectric element to which the second EAP pin is coupled may be configured to be separated from each other.

Since replenishment of the electrolytic solution is separately performed twice, as described above, it is possible to further improve lifespan characteristics of the pouch-shaped battery cell.

In a concrete example, the pouch-shaped battery cell according to the present invention is configured such that an electrolytic solution that is initially injected includes a film formation additive, and therefore a film is formed on the surface of the positive electrode. In the case in which an electrolytic solution for replenishment that is added includes a film formation additive, however, an additional film is formed, whereby resistance of the pouch-shaped battery cell may increase. Consequently, it is preferable for the electrolytic solution for replenishment to include no film formation additive.

Those skilled in the art to which the present invention pertains will appreciate that various applications and modifications are possible within the category of the present invention based on the above description.

DESCRIPTION OF REFERENCE SYMBOLS

100: Pouch-shaped battery cell
110: Battery case
120: Electrode assembly
121: Upper surface of electrode assembly
130, 230, 330: Inner pouches
131: First surface
132, 232: Second surfaces
133, 233: Side surfaces
140: Penetration member
141, 241: Piezoelectric elements
142, 242: Electroactive polymer (EAP) pins
142*a*, 242*a*: Coupling portions
142*b*, 242*b*: Deformation portions
351: First receiving portion

352: Second receiving portion
361: First EAP pin
362: Second EAP pin

INDUSTRIAL APPLICABILITY

As is apparent from the above description, a pouch-shaped battery cell according to the present invention is configured to have a structure in which, only when pressure in a battery case increases, replenishment of an electrolytic solution is possible, and therefore, when an electrolytic solution initially injected into the pouch-shaped battery cell is depleted and replenishment of the electrolytic solution is necessary, an electrolytic solution for replenishment may move to an electrode assembly.

In addition, only a piezoelectric element having an electroactive polymer attached thereto is added together with an inner pouch having an electrolytic solution for replenishment received therein, whereby it is possible to minimize an increase in overall thickness of the pouch-shaped battery cell.

In addition, since pouch-shaped battery cells are disposed in tight contact with each other to constitute a battery module or a battery pack, the piezoelectric element may generate voltage even due to an increase in pressure in the pouch-shaped battery cell, and therefore the electroactive polymer may be deformed and may penetrate the inner pouch.

Consequently, it is possible to prevent an increase in resistance of the pouch-shaped battery cell through addition of the electrolytic solution for replenishment, whereby it is possible to provide a pouch-shaped battery cell having improved cycle characteristics.

The invention claimed is:

1. A pouch-shaped battery cell comprising:
a battery case made of a laminate sheet;
an electrode assembly received in the battery case;
an inner pouch located adjacent to an outer surface of the electrode assembly, the inner pouch having an electrolytic solution for replenishment received therein; and
a penetration member configured to penetrate the inner pouch in order to discharge the electrolytic solution for replenishment,
wherein the penetration member comprises: a piezoelectric element configured to generate a voltage when a pressure in the battery case increases; and an electroactive polymer (EAP) pin configured to be deformed by the voltage generated by the piezoelectric element to discharge the electrolytic solution from the inner pouch when the pressure in the battery case increases.

2. The pouch-shaped battery cell according to claim 1, wherein the electrolytic solution for replenishment is devoid of a film formation additive.

3. The pouch-shaped battery cell according to claim 1, wherein the inner pouch is located adjacent to at least one of an upper surface or a lower surface of the electrode assembly, the upper surface and the lower surface being outer surfaces of the electrode assembly parallel to an electrode plate of the electrode assembly.

4. The pouch-shaped battery cell according to claim 1, wherein the EAP pin is flat in an initial state, and the EAP pin is bent and deformed in a direction toward the inner pouch when the pressure in the battery case increases.

5. The pouch-shaped battery cell according to claim 4, wherein the inner pouch comprises:
a first surface that faces the electrode assembly;

a second surface that faces the penetration member, the second surface being an outer surface of the inner pouch opposite the first surface; and a side surface extending between the first surface and the second surface.

6. The pouch-shaped battery cell according to claim 1, wherein the piezoelectric element has a flat plate shape, and the EAP pin comprises a coupling portion coupled to the piezoelectric element and a deformation portion configured to be deformed when the voltage increases.

7. The pouch-shaped battery cell according to claim 6, wherein the deformation portion is configured to be bent in a direction perpendicular to the coupling portion and is configured to penetrate the inner pouch when the voltage increases.

8. The pouch-shaped battery cell according to claim 6, wherein the deformation portion is configured to be bent in a direction perpendicular to the side surface of the inner pouch and is configured to penetrate the inner pouch when the voltage increases.

9. The pouch-shaped battery cell according to claim 1, wherein the EAP pin is a first EAP pin, and the penetration member comprises a second EAP pin, both of the first EAP pin and the second EAP pin being connected to the piezoelectric element.

10. The pouch-shaped battery cell according to claim 9, wherein the inner pouch comprises a first receiving portion and a second receiving portion partitioned from each other, and a first deformation voltage at which the first EAP pin is configured to penetrate the first receiving portion and a second deformation voltage at which the second EAP pin is configured to penetrate the second receiving portion are different from each other.

11. A battery pack comprising a battery cell stack having a plurality of pouch-shaped battery cells each according to claim 1, wherein each of the pouch-shaped battery cells is arranged in tight contact with an adjacent one of the pouch-shaped battery cells in the battery cell stack.

12. A pouch-shaped battery cell, comprising:

a battery case made of a laminate sheet;

an electrode assembly received in the battery case;

an inner pouch located adjacent to an outer surface of the electrode assembly, the inner pouch having an electrolytic solution for replenishment received therein; and a penetration member configured to penetrate the inner pouch in order to discharge the electrolytic solution for replenishment, wherein the inner pouch comprises: a first surface that faces the electrode assembly; a second surface that faces the penetration member, the second surface being an outer surface of the inner pouch opposite the first surface; and a side surface extending between the first surface and the second surface, and wherein the penetration member comprises: a piezoelectric element configured to generate a voltage when a pressure in the battery case increases; and an electroactive polymer (EAP) pin configured to be deformed by the voltage generated by the piezoelectric element to discharge the electrolytic solution from the inner pouch when the pressure in the battery case increases.

* * * * *